(12) United States Patent
Glassner et al.

(10) Patent No.: US 9,139,075 B2
(45) Date of Patent: Sep. 22, 2015

(54) DRIVE UNIT FOR A HYBRID VEHICLE

(71) Applicant: ENGINEERING CENTER STEYR GmbH & Co KG, St. Valentin (AT)

(72) Inventors: Rudolf Glassner, Kottes (AT); Helmut Kastler, Freistadt (AT); Roland Heimberger, Haidershofen (AT); Dennis Chistian Knospe, Berlin (DE); Johannes Petritsch, Vienna (AT); Gerhard Wernick, Neuzeug (AT)

(73) Assignee: ENGINEERING CENTER STEYR GmbH & Co KG, St. Valentin (AT)

( * ) Notice: Subject to any disclaimer, the term of this patent is extended or adjusted under 35 U.S.C. 154(b) by 0 days.

(21) Appl. No.: 13/958,700

(22) Filed: Aug. 5, 2013

(65) Prior Publication Data

US 2014/0041483 A1  Feb. 13, 2014

(30) Foreign Application Priority Data

Aug. 10, 2012  (DE) .......................... 10 2012 214 327

(51) Int. Cl.
| | |
|---|---|
| *F16H 37/06* | (2006.01) |
| *B60K 6/42* | (2007.10) |
| *B60K 6/387* | (2007.10) |
| *B60K 6/405* | (2007.10) |
| *B60K 6/48* | (2007.10) |

(52) U.S. Cl.
CPC . *B60K 6/42* (2013.01); *B60K 6/387* (2013.01); *B60K 6/405* (2013.01); *B60K 6/48* (2013.01); *B60K 2006/4825* (2013.01); *Y02T 10/6221* (2013.01); *Y02T 10/6252* (2013.01); *Y10S 903/902* (2013.01); *Y10T 74/19051* (2015.01)

(58) Field of Classification Search
USPC ......... 74/661, 665 A; 192/3.29, 48.1, 113.35; 180/65.1; 903/912, 914, 952
See application file for complete search history.

(56) References Cited

U.S. PATENT DOCUMENTS

| | | | | |
|---|---|---|---|---|
| 6,155,364 | A  * | 12/2000 | Nagano et al. ........... | 180/65.235 |
| 2008/0023287 | A1* | 1/2008 | Thiede et al. ................ | 192/48.1 |
| 2008/0047799 | A1* | 2/2008 | Combes et al. .............. | 192/58.5 |
| 2008/0072586 | A1* | 3/2008 | Hammond et al. ............. | 60/330 |
| 2009/0008212 | A1* | 1/2009 | Combes et al. .......... | 192/113.34 |
| 2010/0081540 | A1* | 4/2010 | Krause et al. ...................... | 477/3 |
| 2011/0088958 | A1* | 4/2011 | Ebert et al. ................. | 180/65.22 |
| 2011/0121692 | A1* | 5/2011 | Iwase et al. ................. | 310/67 R |
| 2011/0154944 | A1* | 6/2011 | Mueller ...................... | 74/665 A |
| 2011/0239818 | A1* | 10/2011 | Kasuya et al. .............. | 74/665 A |

(Continued)

FOREIGN PATENT DOCUMENTS

| | | |
|---|---|---|
| DE | 10102831 A1 | 8/2001 |
| DE | 10297305 T5 | 10/2001 |

(Continued)

*Primary Examiner* — William Kelleher
*Assistant Examiner* — Zakaria Elahmadi
(74) *Attorney, Agent, or Firm* — Jordan IP Law, LLC; Todd A. Vaughn

(57) ABSTRACT

A drive unit for a motor vehicle with hybrid drive. The drive unit includes an input shaft which may be connected to the crankshaft of an internal combustion engine of the motor vehicle, a gearbox shaft which may be connected via a toothed hub of a clutch plate as an input shaft of the downstream gearbox, and an electric machine, the rotor of which is connected rotationally fixedly to the clutches. The components are accommodated in a housing having a radially extending housing wall as a bearing wall which forms a physical separation of a chamber of the electric machine and a chamber of the clutches.

15 Claims, 1 Drawing Sheet

(56) References Cited

U.S. PATENT DOCUMENTS

| | | |
|---|---|---|
| 2012/0090425 A1* | 4/2012 | Kasuya et al. .................. 74/661 |
| 2012/0111145 A1* | 5/2012 | Maekawa et al. ........... 74/665 A |
| 2012/0217122 A1* | 8/2012 | Kasuya et al. ........... 192/113.35 |
| 2012/0217825 A1* | 8/2012 | Kasuya et al. .................. 310/54 |
| 2012/0242198 A1* | 9/2012 | Kasuya et al. ............... 310/68 B |
| 2012/0242199 A1* | 9/2012 | Iwase et al. ................. 310/68 B |
| 2012/0319514 A1* | 12/2012 | Iwase et al. ..................... 310/78 |

FOREIGN PATENT DOCUMENTS

| | | |
|---|---|---|
| DE | 10319880 A1 | 5/2003 |
| DE | 112005002200 B4 | 4/2011 |
| DE | 102010041843 A1 | 4/2012 |
| EP | 0621152 A1 | 10/1994 |
| EP | 1027224 B1 | 1/2002 |
| WO | 03/031809 | 4/2003 |

* cited by examiner

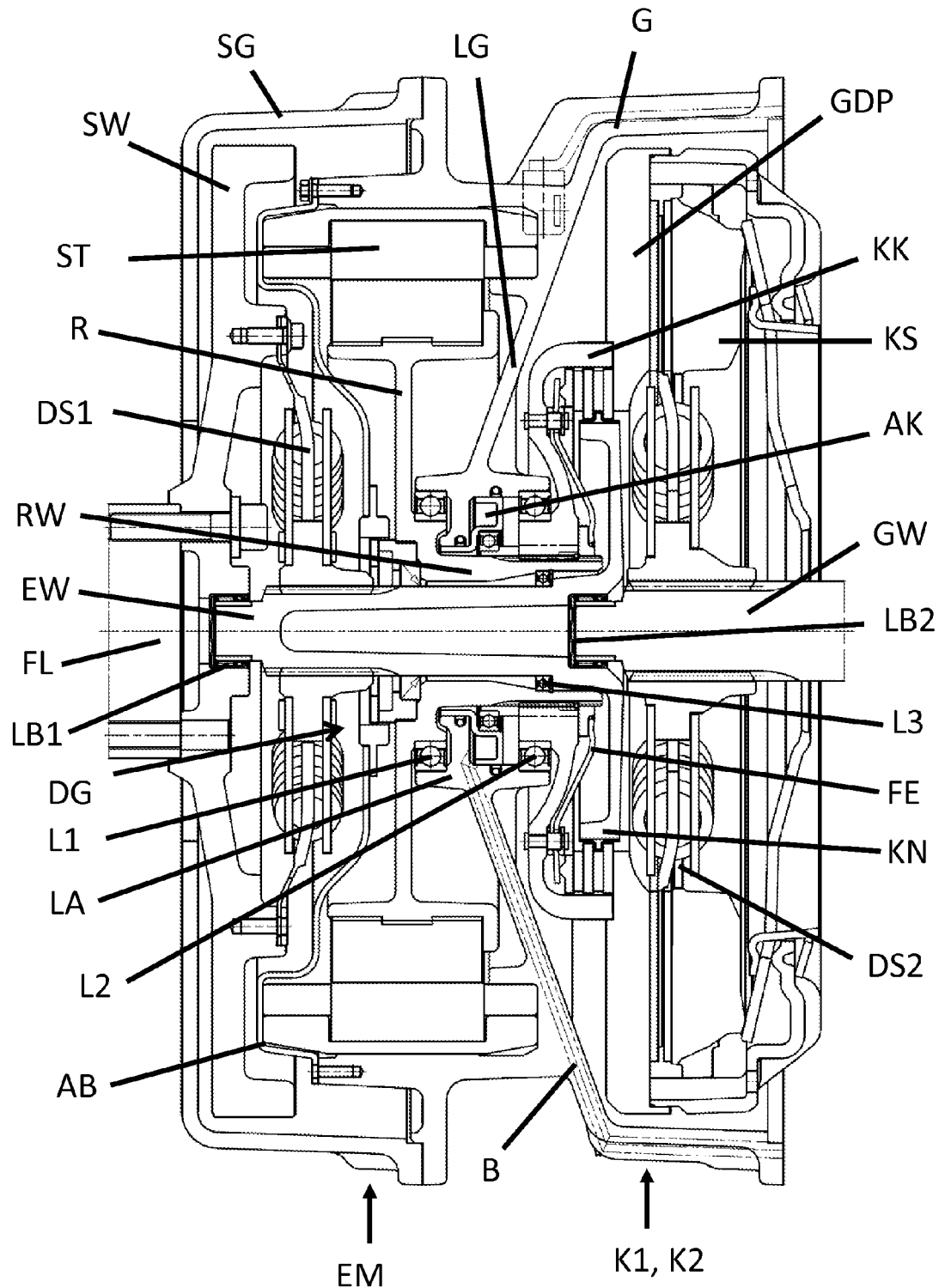

DRIVE UNIT FOR A HYBRID VEHICLE

CROSS-REFERENCE TO RELATED APPLICATIONS

The present application claims priority 35 U.S.C. §119 to European Patent Application No. DE 10 2012 214 327.0 (filed on Aug. 10, 2012), which is hereby incorporated by reference in its entirety.

TECHNICAL FIELD

Embodiments relate a drive unit for a motor vehicle with hybrid drive, the drive unit including an input shaft structurally configured for connection to the crankshaft of an internal combustion engine of the motor vehicle, a gearbox shaft via which the torque is supplied to a downstream gearbox, an electric machine having a rotor connected via a first clutch, a housing which accommodates the drive unit, the housing having a radially extending housing wall as a bearing wall which forms a first chamber for the electric machine and a second chamber for the first clutch.

BACKGROUND

In hybrid vehicles, generator operation and also operation with an internal combustion engine with electric motor support is possible. For example, a portion of the kinetic energy may be returned electrically with the drive unit.

Serial hybrid drive mechanisms that the internal combustion engine and the electric motor are connected in series without mechanical coupling. The internal combustion engine drives a generator which via a battery feeds an electric motor, which in turn generates the drive moment for the wheels.

In parallel hybrid drive, both the internal combustion engine and the electric motor are coupled mechanically with the wheels. The drive moment for the wheels may be generated by one or both drive machines.

Known drive units allow serial, parallel and also generator operation, and are arranged as a corresponding assembly between an internal combustion engine and a manual or automatic gearbox. The drive moment from the internal combustion engine may be disengaged via a clutch, and the drive moment with the electric motor support may be switched through to the gearbox via a further clutch. When the internal combustion engine is disengaged, purely electric drive is possible.

DE 102 97 305 T5 describes a transmission unit with two clutches and an electric machine for a motor vehicle. In this solution an extension of the crankshaft protrudes into the transmission unit.

EP 1 027 224 B1 shows a drive system with two clutches which may be switched independently, and with an electric motor. A flywheel sits directly on a shaft protruding into the drive system.

An electric drive motor for a motor vehicle in accordance with DE 10 2010 041 843 A1 has an annular stator, a rotatably mounted rotor coaxial thereto, a cooling channel running on the stator and a rotary position sensor. The fixed element of the rotary position sensor is arranged on a cover element delimiting the cooling channel.

A hybrid vehicle drive unit in accordance with DE 11 2005 002 200 B4 has a starter clutch in which the cylindrical region of a rotor support component is placed on a circumferential surface of a clutch drum, wherein a play exists between the cylindrical region and the outer circumferential surface.

SUMMARY

Embodiments relate to a drive unit for a motor vehicle with enhanced structural design in comparison with known solutions.

In accordance with embodiments, a drive unit for a motor vehicle with hybrid drive, includes at least one of: an input shaft configured for connection to the crankshaft of the internal combustion engine of the motor vehicle, a gearbox shaft via which the torque is supplied to a downstream gearbox, an electric machine having a rotor of which is configured for connection via a first clutch, a housing which accommodates the drive unit, the housing having a radially extended housing wall as a bearing wall which forms a first chamber for the electric machine and a second chamber for the first clutch.

In accordance with embodiments, a drive unit for a motor vehicle with hybrid drive, includes at least one of: an input shaft configured for connection, for drive purposes, to a crankshaft of an internal combustion engine of the motor vehicle; a gearbox shaft configured for connection, for drive purposes, via a toothed hub of a clutch plate as an input shaft to a downstream gearbox; an electric machine having a rotor which is configured for fixed rotational connection to clutches; a housing which accommodates the drive unit, the housing having a radially extending housing wall as a bearing wall which forms a physical separation of a first chamber for the electric machine and a second chamber for the clutches.

In accordance with embodiments, a drive unit for a motor vehicle with hybrid drive, includes at least one of: an input shaft connected to the crankshaft of an internal combustion engine of the motor vehicle; a gearbox shaft which supplies torque to a downstream gearbox; an electric machine having a rotor; a first clutch connected to the electric machine; a housing which accommodates the input shaft, the gearbox shaft and the electric machine, the housing having a bearing wall that forms a first chamber for the electric machine and a second chamber for the first clutch, in which a rotor of the electric machine is mounted on the bearing wall.

In accordance with embodiments, an integral housing is provided in which, by way of a radially extending housing wall, separates a coupling chamber and a motor chamber from each other, and thus, as a bearing wall carries a bearing for the electric machine. The electric machine in accordance with embodiments has a rotor shaft formed as a hollow shaft. The hollow shaft is mounted by the bearing arranged in the bearing wall. The input shaft of the drive unit is guided through the hollow shaft of the rotor.

Advantageously, due to the separation of the clutch and the electric machine, abrasion induced by wear may not enter the chamber of the electric machine. Also a thermal partitioning is created.

In accordance with embodiments, two clutches are arranged in the clutch chamber, one being a first clutch by which the internal combustion engine is disengaged. The first clutch may be formed as a multi-plate clutch. The second clutch serves for disengaging the gearbox and constitutes the main clutch. The second clutch may be formed as a single-plate dry clutch and is the input clutch for the downstream gearbox. The two clutches are combined into a single clutch unit. Here the clutch basket of the first clutch, formed as the multi-plate clutch, is provided with a fixed rotational connection to the counterpressure plate of the second clutch. The counterpressure plate here forms a friction surface of the first clutch, the multi-plate clutch.

Due to the fixed rotational connection of the clutch basket of the first clutch to the counterpressure plate of the second clutch, for releasable or non-releasable connection, an advantageous thermal coupling between the two clutches is achieved. The thermal capacity of the clutch system is thereby enhanced.

If the gearbox connected downstream of the drive unit in accordance with embodiments of the invention is an automatic gearbox with a converter, the main clutch, i.e., the second clutch, is not required. The drive unit in such a design has a fixed rotational connection to the converter.

The rotor of the electric machine has a fixed rotational connection to the clutch basket of the first clutch. A first bearing sitting in the bearing wall of the housing carries the rotor of the electric machine. The clutch basket of the first clutch is mounted and supported via a second bearing arranged in the bearing wall. The clutch basket is mounted on the hollow shaft of the rotor via a multiple-groove profile (toothed hub) in a fixed rotational and axially moveable manner. This advantageously results in a first direct and a second indirect mounting of the rotor shaft designed as a hollow shaft. This design of the mounting is here advantageous for the tolerances to be observed for the air gap of the electric machine and for the production-induced imbalances in the clutch unit.

Advantageously, The mounting described of the rotor shaft and the clutch basket gives a tilt-stable support with a wide bearing base. The bearings are designed as individually sealed units. Furthermore the clutch unit may be exchanged when the gearbox has been removed, the rotor shaft of the electric machine remains held in a stable manner in the housing via the first bearing.

The crankshaft of an internal combustion engine is connected by way of a flange to a flywheel. This flywheel acts on the input shaft via a torsional vibration damper, in which the torsional vibration damper is coupled with the input shaft via a toothed hub (multiple-groove profile). The flywheel extends, lying partially axially outside, over the region of the end windings of the electric machine, and the input-side torsional vibration damper with its bolted connections lies partly or fully inside the end windings. Thus, as compact a construction as possible in the axial direction is achieved.

The input shaft is mounted as a pilot bearing in the flange holding the crankshaft, the flywheel, in the direction of the crankshaft via a sealed bearing bush. The input shaft is mounted with a further sealed bearing in the rotor shaft of the electric machine, formed as a hollow shaft. The clutch hub of the first clutch, which is firmly connected to or moulded on or attached integrally to the input shaft, aligns the input shaft axially. The gearbox input shaft is mounted in the input shaft via a second sealed bearing bush.

The first clutch is actuated via compressed air and an annular working piston. The working chamber is formed by a cylindrical housing expansion in the bearing wall which serves as an end shield for the bearing of the rotor shaft of the electric machine and for the bearing of the clutch basket. The working piston is designed as a stepped piston and is sealed via two axially spaced seals inserted directly in the housing. The slip surfaces are the cylinder outer faces of the stepped piston, which is produced as a ready-moulded steel piston without machining.

The actuator piston is arranged between the first bearing for the rotor shaft of the electric machine and the second bearing for the clutch basket of the first clutch. The sealed thrust bearing and the seal of the stepped actuator piston are thus protected from contaminants from the clutch chamber, the chamber of the electric machine and a further chamber which receives the input-side torsional vibration damper.

A closed thrust collar is pressurised via actuating elements which lead through recesses of the clutch basket lying radially as far inward as possible. The thrust collar lies under force fit against the spring element of the first clutch. The thrust bearing is centred on the rotor shaft via a sliding seat, the stepped piston is guided radially and positioned axially by the thrust bearing. Thus a tilt-stable guidance of the piston is achieved. The axial force of actuation via the thrust bearing should be kept as small as possible, which may be achieved by a corresponding translation ratio in the clutch spring of the first clutch.

The working piston acts in a pressure-relieving manner against the spring elements which compress the plates of the clutch basket and those of the plate carrier. The compressed air is supplied via a bore, a channel in the housing wall.

The actuation of the second clutch (i.e., the main clutch) is the standard actuation of the automatic gearbox. The actuation forces of the first and second clutch of the clutch unit act against each other so that the axial force is subtracted, and hence the load is relieved on the bearing of the rotor with the clutch unit. The axial load of the bearing is small, being the difference between the two actuation forces.

The high voltage connections of the electric machine are guided out of the stator winding of the electric machine to the end contact machining on the output-side housing flange. A radially outer terminal box with external machining on the housing of the drive unit, is consequently, not required.

The rotary emitter (position sensor) is arranged between the input-side torsional vibration damper and the rotor shaft of the electric machine. The stator of the rotary emitter with plug and cable connection is carried by the cover plate or is pre-mounted on the cover plate. The rotor of the rotary emitter is connected to the rotor shaft rotationally fixedly via a carrier ring. A seal may be arranged in this carrier ring which seals the two adjacent chambers.

Mounting with preassembled components takes place in the order described below. The first bearing and the actuator seals are fitted in the housing. The stator of the electric machine with cooling jacket applied is inserted on the drive side in the housing. The rotor, pre-mounted on the rim-like carrier ring of the rotor shaft, is inserted and centred in the housing via the first bearing. The carrier ring with the rotor of the rotary emitter is installed in the rotor shaft of the electric machine. The pre-mounted cover plate with the stator of the rotary emitter, plug and wiring, is bolted to the housing. The actuating piston is inserted in the housing on the output side and the second bearing installed in the housing. The high voltage connections are connected to the stator contacts of the output-side flange through an opening in the housing wall. The opening in the housing wall is tightly sealed by means of a cover. The preassembled clutch unit with actuator elements is installed and centred in the housing via the second bearing. This assembly is bolted to the internal combustion engine via the pre-prepared interfaces, and the downstream gearbox is bolted to the housing of the drive unit. In the case of repair of one or both clutches of the clutch unit, this may be exchanged without having to release the housing of the drive unit from the housing of the internal combustion engine. The chambers receiving the rotary torsional vibration damper and the electric machine remain unaffected.

DRAWINGS

In the text which follows, embodiments will be described, by way of example, referring to the drawings, in which:

FIG. 1 illustrates a sectional view of a drive unit in accordance with embodiments.

DESCRIPTION

FIG. 1 illustrates a section through the drive unit that includes a housing G with a radially extending housing wall as a bearing wall LG. The bearing wall LG physically and operatively divides or otherwise separates the housing into two chambers. The first chamber receives clutches K1, K2 and the second chamber is configured to accommodate an electric machine EM.

The bearing wall LG has a bearing holder LA configured to support two bearings L1, L2. The rotor R of the electric machine EM and the rotor shaft RW, designed as a hollow shaft, are mounted on the housing side via bearing L1. A clutch basket KK of the first clutch K1, formed as a multi-plate clutch, is mounted on the housing side via the second bearing L2.

The crankshaft of an internal combustion engine (not illustrated) is connected via a flange FL to a flywheel SW. The flywheel SW acts via a first torsional vibration damper DS1 on an input shaft EW which passes through the rotor shaft RW, designed as a hollow shaft, of the electric machine EM. The torsional vibration damper DS1 is connected to the input shaft EW rotationally fixedly via a toothed hub.

The input shaft EW is mounted in the flywheel SW via a bearing bush LB1 and in the rotor shaft RW via a bearing L3. The gearbox shaft GW is mounted in the input shaft EW via a bearing bush LB2. The torque is supplied to a gearbox (not illustrated) via the gearbox shaft. The input shaft EW is furthermore positioned axially via the clutch hub KN in relation to the rotor shaft RW, designed as a hollow shaft.

The electric machine EM includes a rotor R and a stator ST fixedly arranged in the housing G. The electric machine EM is arranged in a separate chamber by way of a cover plate AB placed in the housing G. The cover plate AB has seals in a region of the passage of the input shaft EW, and a rotary emitter DG to detect the rotor position. The stator of the rotary emitter DG with plug and cable connection is carried by the cover plate or is pre-mounted on the cover plate AB. The rotor of the rotary emitter has a fixed rotational connection to the rotor shaft RW via a carrier ring. In particular, a seal is arranged in this carrier ring, by way of which the chamber of the torsional vibration damper DS1 is sealed from that of the electric machine EM. The flywheel SW and the torsional vibration damper DS1 are arranged in a chamber of the flywheel housing SG upstream of the chamber of the electric machine EM. The flywheel housing of the internal combustion engine (not illustrated) has in the middle an opening for the connection of the crankshaft to the flywheel SW via the flange FL.

The clutch basket KK of the first clutch K1 sits rotationally fixed via a toothed hub on the rotor shaft RW, designed as a hollow shaft. The input shaft has a clutch hub KN which, with the clutch basket KK and the disc coupled to the clutch hub KN, forms a multi-plate clutch. This multi-plate clutch is closed via the spring element FE and opened via an annular working piston AK which sits between the bearings L1 and L2 and may be pressurised with compressed air. The working piston AK acts via actuating elements to relieve the pressure on the spring element FE. The working piston AK is pressurised with compressed air via a bore B in the housing G, in the bearing wall LG.

The clutch basket KK of the first clutch K1 is coupled rotationally fixedly with the back of a counterpressure plate GDP of a single-plate dry clutch, which forms the second clutch K2 and the main clutch for the downstream gearbox (not illustrated). The clutch plate KS of clutch K2 is connected for drive purposes with the gearbox shaft GW via a second torsional vibration damper DS2 and via a toothed hub. The second clutch K2 is actuated in the usual manner (not illustrated).

The drive unit illustrated is arranged between an internal combustion engine and a gearbox and is connected via flange connections to the flywheel housing and the gearbox housing (not illustrated).

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS

G Housing
LG Housing wall, bearing wall
SG Flywheel housing
LA Bearing holder
K1, K2 First clutch, second clutch
EM Electric machine
R Rotor
ST Stator winding
L1, L2 First bearing, second bearing (rotor shaft, clutch basket)
KK Clutch basket (first clutch, multi-plate clutch)
FL Flange (crankshaft)
SW Flywheel
DS1, DS2 First, second torsional vibration damper
EW Input shaft
RW Rotor shaft
GW Gearbox shaft
LB1, LB2 Bearing bush (flywheel, gearbox shaft)
L3 Bearing ring
AB Cover plate
KN Clutch hub
FE Spring element (first clutch)
AK Working piston
B Bore
GDP Counterpressure plate (second clutch)
KS Clutch plate

What is claimed is:
1. A drive unit for a motor vehicle with a hybrid drive, the drive unit comprising:
a housing having a radially extending bearing wall defining a first chamber and a second chamber;
a clutch unit in the first chamber and which includes a first clutch and a second clutch, the first clutch having a clutch basket mounted on the bearing wall and which is to disengage a drive moment of an internal combustion engine of the motor vehicle, and the second clutch hav- ing a counterpressure clutch plate which has a fixed rotationally connection to the clutch basket;

an electric machine in the second chamber and operatively connected to the clutch unit, the electric machine including a rotor fixedly connected to the clutch basket and mounted on the bearing wall, wherein the bearing wall physically and thermally partitions the clutch unit and the electric machine;

a gearbox shaft in the second housing chamber to supply torque to a downstream gearbox which is to be disengaged by the second clutch;

an input shaft for connection to a crankshaft of the internal combustion engine of the motor vehicle, the gearbox shaft being mounted in the input shaft;

a first torsional vibration damper mounted on the input shaft and which transmits the torque of the internal combustion engine to the input shaft; and a second torsional vibration damper in the second housing chamber to connect the gearbox shaft to the counterpressure clutch plate.

2. The drive unit of claim 1, wherein the bearing wall has a bearing holder upon which is mounted the rotor of the electric machine.

3. The drive unit of claim 2, wherein the bearing holder has an annular working piston to be pressurised with a pressure medium which actuates the first clutch.

4. The drive unit of claim 2, wherein:
the bearing holder supports a rotor shaft of the rotor of the electric machine; and
the bearing holder directly carries a clutch part mounted directly and rotationally mounted on the rotor shaft.

5. The drive unit of claim 1, wherein the rotor of the electric machine has a hollow rotor shaft through which the input shaft is guided.

6. The drive unit of claim 1, wherein the input shaft has a fixed rotational connection to a clutch part.

7. The drive unit of claim 1, wherein the first clutch has a multi-plate clutch hub.

8. The drive unit of claim 7, wherein the multi-plate clutch hub is integrally connected to the input shaft.

9. The drive unit of claim 1, wherein the counterpressure plate of the second clutch forms a friction surface of the first clutch.

10. The drive unit of claim 1, wherein the input shaft sits coaxially to a flange, and configured to couple the crankshaft of the internal combustion engine, and to the gearbox shaft, and is mounted in bearing bushes.

11. The drive unit of claim 1, wherein the electric machine is separated via a cover plate arranged in the housing from the first torsional vibration damper.

12. The drive unit of claim 11, further comprising at least one seal arranged in a region of a passage of the input shaft through the cover plate.

13. The drive unit of claim 11, further comprising a rotary emitter arranged in the region of the passage of the input shaft through the cover plate, and configured to detect a position of the rotor shaft.

14. The drive unit of claim 13, wherein the stator of the rotary emitter is arranged in the cover plate.

15. The drive unit of claim 1, further comprising a flywheel housing in a flywheel housing and which acts, via the first torsional vibration damper on the input shaft, wherein the clutches are exchangeable without separating the housing of the drive unit from a housing of a flywheel.

* * * * *